United States Patent [19]

Casad et al.

[11] 4,007,945
[45] Feb. 15, 1977

[54] SWING-OUT SHOCK ABSORBING HITCH

[75] Inventors: Edward F. Casad; Richard E. Jones, both of St. Marys, Ohio

[73] Assignee: Ajax Machine and Welding Company, St. Marys, Ohio

[22] Filed: Oct. 6, 1975

[21] Appl. No.: 619,586

[52] U.S. Cl. .......................... 280/478 B; 280/487
[51] Int. Cl.² ........................................ B60D 1/16
[58] Field of Search ....... 280/478 R, 478 A, 478 B, 280/483, 484, 485, 486, 487

[56] References Cited

UNITED STATES PATENTS

| 1,422,189 | 7/1922 | Eckertz | 280/478 A |
| 1,590,702 | 6/1926 | Scott | 280/486 X |
| 1,743,119 | 1/1930 | Cowell | 280/487 |
| 2,067,794 | 1/1937 | Seyferth | 267/138 |
| 2,820,649 | 1/1958 | Demarest | 280/478 B |
| 2,873,982 | 2/1959 | Graham | 280/478 R |
| 2,973,971 | 3/1961 | Oddson | 280/478 B |

Primary Examiner—Robert R. Song
Assistant Examiner—R. Schrecengost
Attorney, Agent, or Firm—Gust, Irish, Jeffers & Rickert

[57] ABSTRACT

A hitch for coupling a towing and a towed vehicle is disclosed having a swing-out and pivot feature which allows the vehicle to be approximately positioned for coupling whereupon a gravity operated latch may be raised, a slide portion of the hitch extended from the frame portion thereof and pivoted in a horizontal plane to perfect the alignment of the vehicle coupling mechanism. When the towing vehicle is subsequently moved toward the towed vehicle, the latch drops back into a position where it engages both the slide and frame portions to transmit the towing forces therebetween. The slide itself may comprise first and second members relatively movable between rigid stop positions and including means for cushioning end thrust shocks having a resilient member which mechanically engages the two slide members urging them toward a relative position intermediate the rigid stop positions.

14 Claims, 5 Drawing Figures

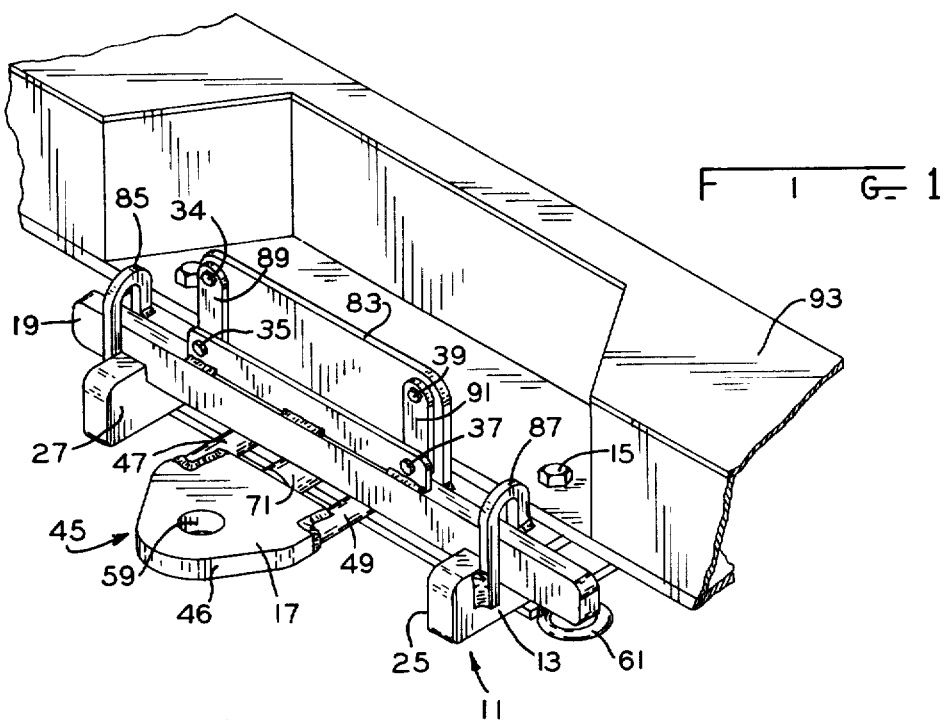
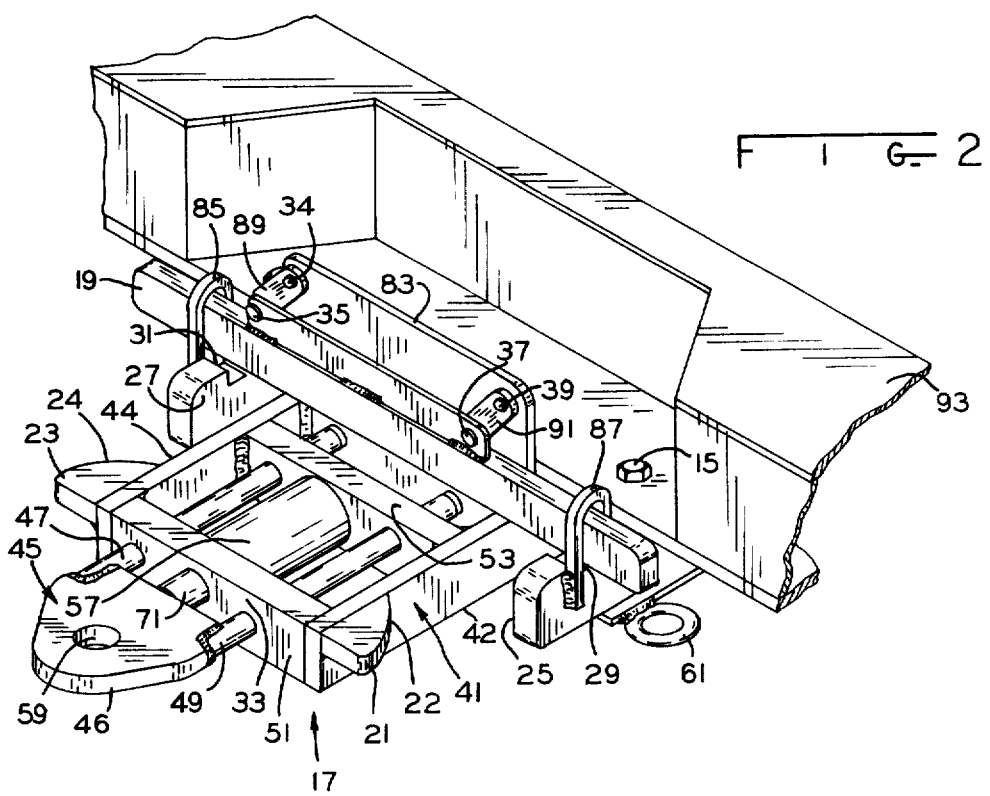

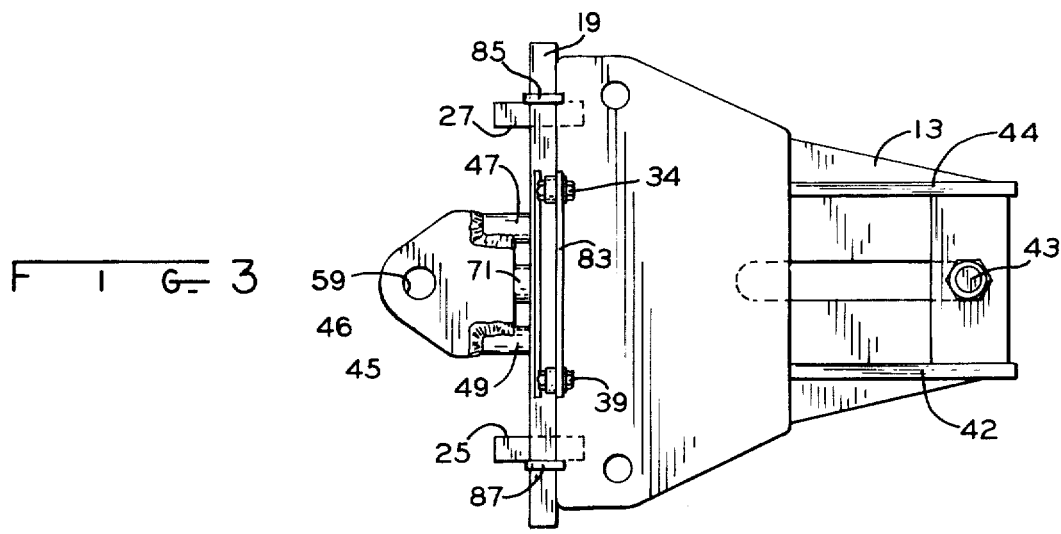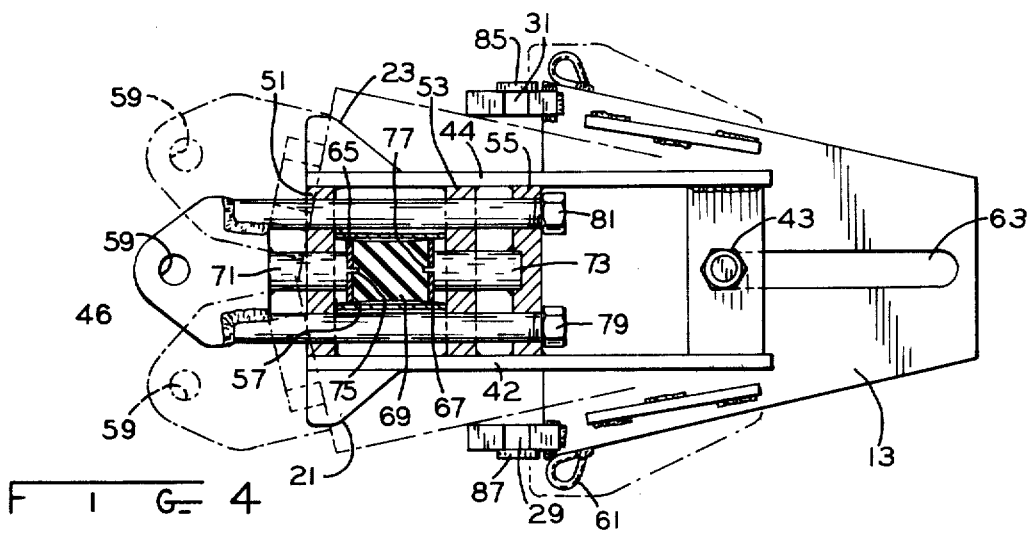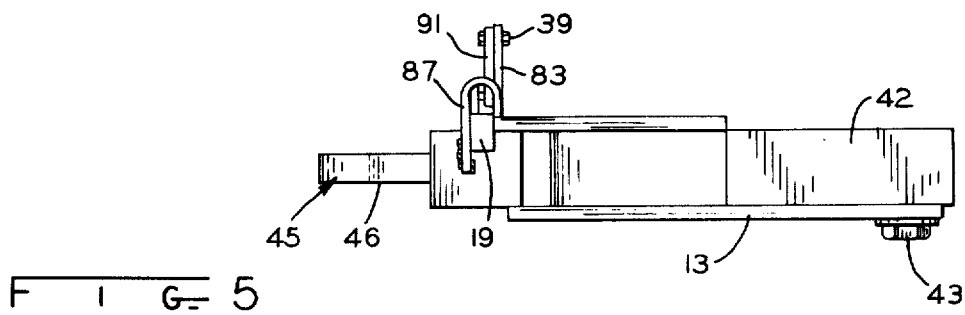

SWING-OUT SHOCK ABSORBING HITCH

CROSS REFERENCE TO RELATED APPLICATIONS

The present application contains subject matter disclosed in Edward F. Casad and Richard E. Jones' copending application Ser. No. 583,871, filed June 5, 1975, and entitled Shock Absorbing Vehicle Coupling.

BACKGROUND OF THE INVENTION

Field of the Invention

The present invention relates generally to vehicle coupling mechanism and more particularly to such mechanisms which cushion end thrust shocks between the vehicles and which have a pull-out and pivot feature for perfecting the alignment of the vehicle for coupling.

The art of interconnecting vehicles in a tractive mode is well established and typically an otherwise rigid coupling including a ball and socket arrangement is employed to permit the two vehicles to swivel angularly relative to one another in negotiating turns to the left or right as well as in negotiating abruptly encountered inclines. With such coupling schemes any jolt or shock experienced by one of the vehicles is immediately transmitted to the other by way of the coupling resulting in not only annoyance to the driver, but also, due to the relatively large masses of the vehicles, great strain on the coupling mechanism. Also in such conventional coupling schemes the towing vehicle must be rather precisely positioned relative to the towed vehicle in preparation for coupling the two together.

It has been recognized that a resilient coupling between the vehicles will distribute the effect of an abrupt shock over a longer time interval materially reducing the stress on the coupling mechanism. Prior art schemes have provided spring loading, cushioned bump stops at the ends of the coupling travel, multiple resilient bushings and other more complex resilient structures which experience shear during the cushioning action. An improvement on such resilient couplings is disclosed and claimed in our aforementioned application, the entire disclosure of which is specifically incorporated herein by reference.

It has also been recognized that the positioning of two vehicles preparatory to coupling may be expedited by the provision of a coupling mechanism which is movable within limits to compensate for imprecise initial alignment of the two vehicles. Such known schemes typically employ an at least two part hitch where one part may be moved relative to the other from a locked towing position by withdrawing a pin against spring tension from its locking position and moving the one part to perfect the hitch alignment. Such spring loaded pins passing through the two parts transmit the forces between those two parts. In addition to the drawbacks noted in the Applicant's aforementioned application, the prior art suffers from one or more defects, namely, the structures are complex, expensive to manufacture, the pin and holes are subject to wear, and some difficulty in aligning the spring loaded pin and corresponding holes may be experienced.

SUMMARY OF THE INVENTION

Among the several objects, features and advantages of the present invention may be noted the provision of a shock absorbing hitch having a pull out and pivot feature to simplify the initial hook-up alignment of two vehicles; the provision of a simple and reliable swing-out vehicle coupler; the provision of a swing-out hitch where normal towing forces are borne by a sturdy horizontally disposed cross member; and the provision of a swing-out hitch arrangement having a gravity actuated latch.

In general a swing-out hitch in one form of the invention is provided for perfecting the alignment of a towing with a towed vehicle just prior to coupling the two vehicles together including a frame which is rigidly attachable to one of the vehicles, a slide coupled to the frame for sliding movement therealong which is pivotable through a limited range in a generally horizontal plane when in one position and is substantially prohibited from such pivotable movement when in another position. The slide may be latched in its nonpivotable position by a gravity actuated latch which may include a generally horizontally disposed cross member which engages both the slide and the frame when in their nonpivoting position. The slide may include first and second members themselves relatively slidable between fixed stop positions along with a cushioning structure for retarding the relative free movement of these members which resiliently urges the members toward a position intermediate either of the stop positions thereby providing a shock absorbing hitch having a swing-out alignment feature.

BRIEF DESCRIPTION OF THE DRAWINGS

FIG. 1 is a perspective view of a hitch according to the present invention latched in its normal towing position and attached to a step type bumper of a towing vehicle;

FIG. 2 is a perspective view similar to FIG. 1 but illustrating the slide portion of the hitch in its extended or pivotal first position;

FIG. 3 is a top view of the hitch with the slide in the second or normal towing position;

FIG. 4 is a top sectional view of the hitch of FIG. 3 illustrating the slide in its extended position and illustrating in dotted lines the potential pivoted positions thereof; and FIG. 5 is a side view of the hitch in the position illustrated in FIGS. 1 and 3.

Corresponding reference characters indicate corresponding parts throughout the drawing and the following examples illustrate the invention in one form thereof and are not to be construed as limiting in any manner.

DESCRIPTION OF THE PREFERRED EMBODIMENT

Referring now to the drawing in greater detail, the swing-out shock absorbing hitch 11 is seen to include a frame 13 which is rigidly attached to a towing vehicle bumper step, for example, by bolts such as 15 passing through the hitch frame 13 and the step. A slide or slide assembly 17 is coupled to the frame 13 for sliding movement therealong between a first position depicted in FIG. 2 where the slide is pivotable relative to the frame 13 in a generally horizontal plane and the position depicted in FIG. 1 where the slide 17 is latched in its normal towing position by a generally horizontally disposed cross member or latch bar 19. The slide 17 may pivot through a limited range in a generally horizontal plane when in the position illustrated in FIG. 2; however, the engagement of cams or ears 21 and 23 and rails 42 and 44 with corresponding frame portions 25 and 27 when the slide 17 is in its second position limits its pivotal movement. When the slide 17 is retracted from the position illustrated in FIG. 2 to the position illustrated in FIG. 1, the cross member 19 is gravity actuated to fall into the notches 29 and 31 and also to fall in front of and engage the face 33 of the slide 17 to maintain the slide in its second position.

More particularly in FIG. 1 the slide 17 is maintained in its second or normal towing position and the force between a towing and towed vehicle is transmitted between the slide 17 and the frame 13 by the latch bar 19 which is a gravity actuated generally horizontally disposed cross bar or member. When the cross bar 19 is manually lifted, the pivotable parallelogram linkage supporting the cross bar 19 pivots at each of the four pivot points 34, 35, 37 and 39 on the cross bar 19 and frame 13 as shown allowing the cross bar 19 to move between positions parallel to and displaced vertically from one another such as the position illustrated in FIG. 2 where the face 33 clears the bottom of the cross bar 19 so that the slide 17 may be extended to the position illustrated in FIG. 2.

The slide 17 includes two relatively slidable frames 41 and 45. Slidable frame 41 is generally rectangular, including two parallel side rails 42 and 44 and two transverse, spaced apart, parallel bars 51 and 53 welded thereto. Slidable frame 45 includes a hitching plate 46 having welded thereto two parallel spaced apart guiding rods 47 and 49, the latter being threaded at the distal ends. The rods 47 and 49 are slidably received by respective companion apertures in transverse bars 51 and 53 thereby slidably mounting frame 45 onto frame 41. On the distal ends of the rods 47 and 49 is secured a stop plate 55 by means of nuts 79 and 81, respectively, the plate 55 being movable between rails 42 and 44. Thus, extension of slidable frame 45 from frame 41 can result in abutting engagement of plate 55 with transverse bar 53 to provide a first stop position, while protraction of frame 45 can bring hitching plate 46 into engagement with bar 51 to provide a second stop position.

Slidable frame 41 is coupled to hitch frame 13 by means of a bolt 43 (FIGS. 3, 4 and 5).

Slidable frame 45 is resiliently biased toward a position intermediate the two stop positions by cushioning means contained within the housing 57 and illustrated in greater detail in FIG. 4 and described more fully later. The plate 46 has an aperture 59 which provides means for coupling to a second vehicle for accepting a clevis and pin type coupling or for the mounting of a standard hitch ball. Safety chain loops on frame 13 such as 61 may also be provided.

The slide 17 and frame 13 are movably interconnected by bolt 43 which slidably engages a slot 63 in the frame 13. The slot 63 allows about 6 inches between the retracted and extended slide positions and when the slide 17 is extended as in FIG. 4, plus or minus 7 inches of arcuate movement about bolt 43 is available to the coupling aperture 59. The rigid bars 51 and 53 in addition to providing sliding support to the parallel extending rods 47 and 49 also form end walls for the housing 57. Within the housing 57 are a pair of compressive, force-transmitting end plates 65 and 67 at opposite ends of a resilient polyurethane bushing or plug 69. A pair of cantilever portions or rods 71 and 73 are secured to and extend from the respective plate 46 and bars 55 toward one another and into the housing 57 through respective clearance openings in the bars 51 and 53, respectively, to engage the compressive, force-transmitting end plates 65 and 67. The provision of centrally located, relatively small diameter holes in the end plates 65 and 67 and which receive, respectively, corresponding, reduced diameter holding pins 75 and 77 on the cantilever portions 71 and 73 function to hold the housing 57 in place so long as the nuts 79 and 81 remain fastened on the threaded ends of rods 47 and 49, respectively. Under the minimum compression or strain condition the plug 69 positions the two slidable frames 41 and 45 of the slide 17 relatively intermediate the two rigid stop positions and any relative displacement of the two frames 41 and 45 toward either rigid stop position results in compressive distortion of the resilient plug 69.

Returning to the latch arrangement in FIG. 1, the plate 83 which forms the support for the fixed pair of pivot points 34 and 39 is welded to or integral with the frame 13 as are the two inverted U bar retainers 85 and 87 which receive latch bar 19. The two links 89 and 91 may, for example, be pivotally attached to the plate 83 by a pair of bolts at pivot points 34 and 39 and may carry a pair of pivot studs at 35 and 37 for pivotal connection to latch bar 19 so that the latch bar 19 as well as the two links 89 and 91 may be easily removed from or attached to the frame 13 by the two bolts at 34 and 39. Similarly, the slide 17 is removed from the frame 13 by simply disconnecting the bolt 43 and the slide assembly 17 itself is easily dissembled by removing nuts 79 and 81 from rods 42 and 49.

Viewing FIG. 2, the latch bar 19 slidably rests on the frame 41 and is thereby elevated out of registry with notches 29 and 31 of frame 13. By moving the frame 41 toward the right as viewed in FIG. 2, the end bar 51 thereof is moved to a position at which it just clears bar 19 allowing the latter to pivotally gravitate by means of links 89 and 91 to a position in front of surface 33 and into notches 29 and 31. At this point, bolt 43 engages the end of slot 63. This frame 41 is thus locked to hitching frame 13 by end bar 51 being in engaging position with respect to latch bar 19 and bolt 43 being immediately adjacent to the end of slot 63.

A leftward (as viewed in FIG. 2) or towing force applied to slidable frame 45 results in force-transmitting engagement of surface 33 of end bar 51 with latch bar 19, the latter carrying the towing load to the vehicle via the notches 29 and 31 in frame 13.

With the hitch on the towing vehicle in the locked position of FIG. 1, if it is desired to make a connection to a vehicle to be towed, the latch bar 19 is manually lifted out of engagement with notches 29 and 31 and above end bar 51. The slidable frame 41 which carries frame 45 is then drawn rearwardly as shown in FIGS. 2 and 4. By reason of the pivotal connection 43, 63 and the extensibility of frame 41, the hitch plate 46 can be moved into registry with the counterpart of the hitch on the vehicle to be towed and the hitching step thus completed.

With the hitch in the position illustrated in FIG. 2 and the towing vehicle 93 coupled by way of aperture 59 to a towed vehicle, simple "backing up" of the towing vehicle will cause the slide 17 to move into the frame 13 until the latch bar 19 clears the front face 33 of the slide 17 whereupon the latch bar 19 drops downwardly into its slots 29 and 31 to securely grip the slide within the frame for normal towing operation.

Should the frame 41 be pivoted out of longitudinal alignment with frame 13, backing up will cause one of the rails 42 or 44 initially and then thereafter one of the inclined edges 22 or 24 to engage the end of a respective one of the notched frame portions 25 or 27 which will result in the frame 41 being pivoted or cammed inwardly into longitudinal alignment. This alignment is assured by the spacing of the two frame portions 25 and 27 being only slightly greater than the corresponding distance between the outer ends of the ears 21 and 23. With the ears 21 and 23 being disposed between frame portions 25 and 27, the frame 41 is thus aligned and the latch bar 19 can drop in front of end bar 51 in parallelism therewith without requiring any further manual manipulation.

From the foregoing it is now apparent that a novel swing out shock absorbing hitch 11 has been presented meeting the objects and advantageous features set out hereinbefore as well as others. Numerous modifications will readily suggest themselves to those of ordinary skill in the art and accordingly the scope of the present invention is to be measured only by that of the appended claims.

What is claimed is:

1. A hitch for interconnecting a towing and a towed vehicle comprising:
   a frame rigidly attachable to one of the vehicles;
   a slide coupled to the frame for sliding movement therealong between first and second positions, the slide being pivotable relative to the frame through a limited range in a generally horizontal plane when in the first position and being adapted for coupling to the other of the vehicles;
   means associated with the frame for substantially limiting pivotal movement of the slide when the slide is in the second position; and
   a gravity actuated latch for maintaining the slide in the second position including a generally horizontally disposed cross member for engaging both the slide and the frame when the slide is in the second position and pivotable parallelogram linkage support means interconnecting the cross member and the frame for allowing movement of the cross member between positions parallel to and displaced vertically from one another.

2. The hitch of claim 1 wherein the slide telescopingly engages the frame and is movable between the first position where the slide extends from the frame and the second position where the slide is retracted into and is substantially limited in horizontal movement by the frame.

3. The hitch of claim 1 wherein the slide comprises a first member coupled to the frame and including guide means, a second member slidingly supported by the first member including a pair of generally parallel extending portions engaged with the guide means and slidable therein between rigid stop positions, and cushioning means for retarding the free movement of the second member between the rigid stop positions.

4. The hitch of claim 3 wherein the towing forces between towing and towed vehicles is transmitted between the frame and first slide member by way of the latch.

5. The hitch of claim 3 wherein the cushioning means comprises resilient means mechanically engaging the first and second members for urging the second member toward a position intermediate the rigid stop positions relative to the first member with relative displacement from the intermediate position toward either rigid stop position causing compression of the resilient means.

6. The hitch of claim 3 wherein the first member includes a housing having openings at opposite ends thereof;
   the cushioning means includes a pair of compressive force transmitting end plates disposed inside the housing each adjacent a housing opening, and a resilient plug disposed between the end plates and trapped within the housing; and
   the second member includes a pair of cantilever portions each extending into a housing opening to compress by way of a corresponding end plate the resilient plug when moved toward the housing.

7. The hitch of claim 3 wherein the guide means comprises a pair of frame bars each having a pair of aligning apertures therein, the second member including a pair of opposed bump stop plates affixed to opposite ends of the pair of parallel extending portions, a bump stop plate engaging a frame bar to define a rigid stop position.

8. The hitch of claim 7 wherein the latch engages one of the frame bars when the slide is in the said second position whereby towing forces between towing and towed vehicles is transmitted between the frame and first slide member by way of the latch.

9. A hitch for interconnecting a towing and a towed vehicle comprising:
   a frame rigidly attachable to one of the vehicles;
   a slide coupled to the frame for sliding movement therealong between first and second positions, the slide being pivotable relative to the frame through a limited range in a generally horizontal plane when in the first position and being adapted for coupling to the other of the vehicles, the slide including a first member coupled to the frame and including guide means, a second member slidingly supported by the first member including a pair of generally parallel extending portions engaged with the guide means and slidable therein between rigid stop positions, and cushioning means for retarding the free movement of the second member between the rigid stop positions;
   means associated with the frame for substantially limiting pivotal movement of the slide when the slide is in the second position; and
   a generally horizontally disposed cross member for engaging both the slide and the frame when the slide is in the second position.

10. The hitch of claim 9 further comprising pivotable parallelogram linkage support means interconnecting the cross member and the frame for allowing movement of the cross member between positions parallel to and displaced vertically from one another.

11. The hitch of claim 9 wherein the horizontally disposed cross member is actuated to engage both the slide and the frame when the slide is in the second position by gravity.

12. The hitch of claim 9 wherein the towing forces between towing and towed vehicles is transmitted between the frame and slide first member by way of the horizontally disposed cross member.

13. The hitch of claim 9 in which said means includes two elongated parallel horizontally spaced apart frame portions having upwardly opening notches for receiving said cross member in said second position, said cross member being an elongated latching bar, an upstanding plate on said frame, a parallelogram linkage interconnecting said bar to said upstanding plate in a position above said notches whereby said bar may be selectively moved into and out of said notches, said slide including two parallel and spaced apart side rails secured together by means of two spaced apart and parallel transverse bars, said latching bar having sliding engagement with the upper surface of said side rails when said slide is in said first position, said latching bar being lifted out of engagement with said notches when in sliding engagement with said side rails, said slide in said second position being removed from sliding engagement with said latching bar whereby the latter pivotally gravitates into said notches and into horizontally engageable position with respect to one of said transverse bars, said frame having a slot, a pin movable in said slot and pivotally connected to said slide whereby said slide can be moved between said first and second position as well as pivotally relative to said frame, said pin being adjacent to the end of said slot when said latching bar is in engageable position with respect to said one transverse bar, said side rails on said slide being disposed between said elongated frame portions and in said second position being parallel thereto and spaced therefrom, said side rails having on the ends thereof distal from said latching bar two laterally extending ears, said ears being of such size as to fit with clearance between said frame portions and having cam surfaces which incline laterally outwardly from said respective side rails in a direction away from said frame portions, said cam surfaces being engageable with said frame portions to center said slide therebetween as said slide is moved from said first to said second position.

14. A hitch for interconnecting a towing and a towed vehicle comprising:

a frame rigidly attachable to one of the vehicles;

a slide coupled to the frame for sliding movement therealong between first and second positions, the slide being pivotable relative to the frame through a limited range in a generally horizontal plane when in the first position and being adapted for coupling to the other of the vehicles, the slide comprising a first member coupled to the frame and including guide means, a second member slidingly supported by the first member and slidable therein between rigid stop positions, and cushioning means for retarding the free movement of the second member between the rigid stop positions, the cushioning means comprising resilient means mechanically engaging the first and second members for urging the second member toward a position intermediate the rigid stop positions relative to the first member with relative displacement from the intermediate position toward either rigid stop position causing compression of the resilient means;

means associated with the frame for substantially limiting pivotal movement of the slide when the slide is in the second position; and a gravity actuated latch for maintaining the slide in the second position.

* * * * *